3,143,514
CATALYTIC POLYMERIZATION OF SILAZANES
William A. Boyer, Tinley Park, Ill., assignor, by mesne assignments, to Dow Corning Corporation, Midland, Mich., a corporation of Michigan
No Drawing. Filed June 15, 1960, Ser. No. 36,146
6 Claims. (Cl. 260—2)

This invention is concerned with certain silicon-nitrogen compositions and, more particularly, to advancing the polymerization of such compositions with selected metallic or metallic compound catalysts.

Broadly, the silicon-nitrogen compounds contemplated by the present invention are those which may be formed as a result of the reaction between ammonia or primary amines and a halosilane. Halosilanes are defined as silicon halides having one or more halogen atoms attached directly to the silicon. Such halosilanes have the generic formula:

$$R_n SiHal_{4-n}$$

wherein R is hydrogen or a monovalent organic group, for example, monovalent hydrocarbon groups, such as alkyl, aryl, and similar groups. Processes for making these compounds and the compounds themselves are disclosed in a number of patents, for example, Haber 2,462,-635 and Cheronis 2,579,417 and 2,579,418.

As indicated in the above patents, the reaction of a halosilane, having the above generic formula, with an ammonia or primary amine results in the substitution of an $NH_2$ or NHR amino group for each of the halogen atoms attached to the silicon. The reaction is normally conducted at temperatures below 0° C., in the absence of water, in order to avoid hydrolysis, and usually in the presence of an inert organic solvent. In many instances, it has been found that, simultaneously or immediately subsequent to the ammonolysis or aminolysis of the halosilanes, additional reactions will occur wherein certain of the resultant reaction products undergo polymerization, forming either chain type polymers or cyclic compositions as further disclosed hereinbelow. In fact, in many instances, it is difficult, if not impossible, to isolate the monomer of such reaction products.

In some instances, the amonolysis or aminolysis reaction products of halosilanes are referred to as "aminosilanes," "silamines" or "silazanes." The term "silazanes" will, at times, be used herein in referring to the particular reaction products contemplated.

The halosilanes and their amonolysis or aminolysis reaction products are also frequently described in terms of their functionality. Functionality is an indication of either the replaceable halogen atoms attached directly to the silicon or the amino groups which have replaced such halogen atoms. Thus, a halosilane having two replaceable halogen atoms attached directly to the silicon would be referred to as being difunctional as would the corresponding ammonolysis or aminolysis reaction products. Likewise, a halosilane having three or four replaceable halogen atoms attached directly to the silicon, as well as the derivative ammonolysis or aminolysis reaction products, would be referred to as being trifunctional or tetrafunctional, respectively. It is possible to have only one replaceable halogen atom attached to the silicon atom, in which event the corresponding amination product would be monofunctional. However, the present invention is only concerned with the ammonolysis or aminolysis reaction products of the di-, tri-, and tetrafunctional halosilanes or those halosilanes covered by the foregoing formula wherein $n$ has a value from 0–2. These products are generally characterized by the presence of an Si-N-Si linkage as a part of their molecular structure.

For purposes of the present invention, a variety of monovalent organic groups may be attached to the silicon atom of the halosilane, including the organic aliphatic and aromatic groups recited in the aforementioned Haber and Cheronis patents. In silazanes derived from difunctional halosilanes, wherein two organic groups are attached to the same silicon atom, the organic groups may be the same or may be different. Thus, for example, both an ethyl and either a methyl or benzyl hydrocarbon radical may be attached to the same silicon of a silazane silicon atom or further both a methyl and a vinyl radical may be attached to the same silicon atom.

Various primary amines may be used if the silazanes are prepared by aminolysis. Typical amines are methylamine, ethylamine, allylamine, aniline, benzylamine and similar amines referred to in the Cheronis patents or mixtures of such amines.

The usual halosilanes subjected to ammonolysis or aminolysis are the chlorosilanes due to the fact that the latter compounds are more readily available and, also, due to the fact that the hydrogen chloride, formed as a by-product, may be easily removed. In general, the difunctional ammonolysis or aminolysis reaction products of the corresponding chlorosilanes have the charateristics of an oily liquid and are thoroughly stable in that they undergo no appreciable change at room temperatures or even moderately elevated temperatures. Most of the difunctional silazanes are considered to be cyclic, generally, either trimers or tetramers, such as hexamethylcyclotrisilazane and octamethylcyclotetrasilazane, whose preparation and properties are disclosed in the aforementioned Haber patent.

Many of the trifunctional and tetrafunctional reaction products have been found to undergo polymerization over varying periods forming viscous liquids or solids, even, in some instances, at room temperature, unless kept in a suitable solvent. It is believed that such polymerized products comprise, for the most part, ring structures linked together forming chains. By selecting appropriate mixed halosilanes, compositions may be formed having properties intermediate of either a purely difunctional or a purely tri- or tetrafunctional composition. Thus, for example, ammonia or a primary amine may be reacted with a mixture of dimethyldichlorosilane and methyltrichlorosilane, in either equal or unequal molar proportions, to give a reaction product having intermediate characteristics as compared to similar compositions derived from the dimethyldichlorosilane by itself or the methyltrichlorosilane by itself. Equimolar mixtures normally will not undergo polymerization at room temperature, at least to the extent of forming a solid, but rather require heating at elevated temperatures to obtain appreciable polymerization.

The present invention has as one object the improvement of resin-forming characteristics of silazanes comprising the ammonolysis or aminolysis reaction products of di-, tri- and tetrafunctional halosilanes or mixtures thereof and, particularly, the lower silazanes, such as the aforementioned trimers and tetramers to improve their adhesive, coating, film-forming and similiar properties.

Another object is the provision of a process whereby silazanes can be polymerized to a higher degree under less stringent conditions than heretofore found necessary.

In accordance with this invention, the polymeric or resin-forming characteristics of the silazanes are modified or enhanced by the use of a catalyst from the class consisting of alkali metals or alkali metal amides. The alkali metals contemplated are lithium, sodium, potassium, rubidium and cesium. Preferred metals are sodium, potassium and cesium. The alkali metal amides are exemplified by the preferred amides, namely potassium or sodium amide, although any of the alkali metal amides may be, likewise, employed.

The extent to which silazanes may be further polymerized to viscous liquids or solids varies depending upon the particular type of silazanes. Thus, as previously indicated, those silazanes which are considered to be purely cyclic, for example, hexamethylcyclotrisilazane, are extremely resistant to further polymerization. In some instances, such silazanes have been rendered relatively viscous, evidencing further polymerization, after prolonged heat treatment at elevated temperatures. Silazanes of higher functionality are more readily susceptible to further polymerization, especially in the presence of heat. Accordingly, while the aforementioned catalysts are applicable to all silazanes to improve and enhance their resin-forming or polymerization characteristics, they have particular utility in connection with the pure cyclic silazanes derived from the lower functional halosilanes.

The catalysts contemplated by the present invention may be added to the silazanes in varying amounts, extending, for example, from .01% to 10% by weight. However, as a practical matter, a maximum of about 2% by weight has been found suitable to obtain the desired conversion of most of the relatively inert, purely cyclic silazanes into products having a considerably higher degree of polymerization. In utilizing the invention, the catalyst is normally added to the silazane followed by heating to temperatures ranging up to about 200–220° C. for periods of, generally, from one to twenty-four hours.

It will be appreciated that the amount of catalyst, temperatures and period of heat required will depend upon the particular catalyst and silazane. The most active catalysts, such as cesium or rubidium, will usually convert the most inert cyclic silazanes into solids within a comparatively short period; whereas, the less active catalyst may only increase viscosity within the same period.

When silazanes are converted into higher polymeric compositions by use of the catalysts as described herein, there is a noticeable evolution of ammonia, confirmed analytically by the loss of three active hydrogens for each amino nitrogen. It is believed that the use of the catalysts contemplated results in a condensation and rearrangement of the silicon-nitrogen units, forming a molecular structure wherein more silicon atoms are attached directly to a single nitrogen atom to form a more branched structure, although the mechanism involved has not been fully developed as of the present.

The following examples are set forth as further illustrating the invention.

Example I 10 cc. of clear liquid hexamethylcyclotrisilazane (prepared by the procedure of Example II of Haber Patent No. 2,462,635) and .01 gram of cesium were mixed in a glass vessel immersed in an oil bath. The vessel was provided with a two-foot glass tubing extending from the mouth to the top thereof and secured in place by means of a cork, the glass tubing serving as an air-cooled reflux condenser. The contents of the vessel were heated at a temperature of 200° C. for a period of twenty-three hours. At the end of this period, the contents were solid. As a control, a similar quantity of the silazane, without catalyst, was subjected to the same treatment. At the end of twenty-three hours, the contents of the vessel were still a clear liquid with no change in refractive index.

Example II 130 grams of octamethylcyclotetrasilazane (a pure white solid melting at 97° C.) and ¼ gram of potassium were heated in a flask under reflux using an oil bath at a temperature of 190° C. for twenty-four hours. At the end of the heating period, the mixture had changed to a viscous, honey-colored liquid, which when cooled became a tan solid melting at about 150° C. A control sample subjected to the same treatment, but without the potassium, remained unchanged.

Example III 50 cc. of clear liquid ammonolysis reaction product of equal molar proportions of dimethyldichlorosilane and methyltrichlorosilane, m.w. 247 and N/Si ratios of 1.20 (prepared using the process of Example I of Haber Patent 2,462,635) were heated with ½ gram of lithium at 200° C. for three hours using the procedure of Example II. Upon cooling at the end of a three hour period, the clear liquid had changed to a highly viscous composition having a honey color.

Example IV

A mixture of 50 cc. of hexamethylcyclotrisilazane and 0.2 gram $NaNH_2$ were heated under reflux using a sand bath for fifteen hours at 188° C. At the end of fifteen hours, the reaction had ceased refluxing and the temperature rose to 230° C. A honey-colored liquid had formed which when cooled solidified to a brittle, glass-like solid having a melting point of about 100° C.

Following is an analysis of the silazane before and after catalyst treatment:

|  | Before | After |
|---|---|---|
| C | 32.83 | 31.00 |
| H | 9.64 | 7.61 |
| N | 19.14 | 18.38 |
| Si | 38.39 | 43.33 |
| Ratio H/C | 3.5 | 2.92 |
| Ratio C/N | 2.0 | 2.0 |
| Ratio C/Si | 2.0 | 1.68 |
| Ratio N/Si | 1.0 | 0.85 |
| Active H/N | 1.0 | 0.37 |

Example V

The reaction of Example IV was repeated using, however, lithium amide in place of the sodium amide. After fifteen hours, the reaction was still under reflux. A slight increase in viscosity was noticed as evidenced by an increase in refractive index from $N_D^{25}$ 1.4422 to 1.4438.

Example VI

Using the procedure of Example I, 50 cc. of a clear liquid (ASTM Gardner viscosity of 1 second) ammonolysis reaction product of equal molar proportions of dimethyldichlorosilane and trimethylchlorosilane were heated for three hours with 0.5 gram of potassium, and filtered hot through a stainless steel screen. Upon cooling, the product obtained was a light honey-colored liquid of high viscosity. The reaction product before and after treatment analyzed as follows:

|  |  |  |
|---|---|---|
| C | 26.17 | 24.61 |
| H | 8.28 | 7.12 |
| N | 24.52 | 21.88 |
| Si | 40.91 | 43.05 |
| Ratio H/C | 3.77 | 3.45 |
| Ratio C/Si | 1.50 | 1.34 |
| Ratio N/Si | 1.20 | 1.02 |
| Active H/N | 0.97 | 0.61 |

The catalysts herein disclosed may be used individually or in combination to achieve a relatively wide range of control over the polymerization of silazanes, and particularly, those silazanes, such as the aforementioned trimers and tetramers, which heretofore were considered substantially stable to further polymerization.

Among the advantages of the present invention are: the reduction in nitrogen content of silazanes while still retaining sufficient nitrogen-silicon bonds to permit their use in further reactions with hydroxyl or similar groups, converting relatively stable liquids to solids and increasing molecular weights.

Having described certain exemplary embodiments of the invention, the same is intended to be limited only by the scope of the following claims.

I claim:

1. A process for polymerizing the reaction product of a member of the class consisting of ammonia and primary amine with a halosilane having the formula $$R_nSiHal_{4-n}$$

wherein R is a monovalent hydrocarbon group and $n$ has a value from 0–2, which comprises heating said reaction product in the presence of a catalytic amount of a catalyst from the class consisting of alkali metals and alkali metal amide.

2. A process as described in claim 1 wherein R is a monovalent hydrocarbon radical.

3. A process for polymerizing the reaction product of a member of the class consisting of ammonia and primary amines with a halosilane having the formula $$R_2SiHal_2$$

wherein R is a monovalent hydrocarbon group which comprises heating said reaction product in the presence of a catalytic amount of a catalyst from the class consisting of alkali metals and alkali metal amides.

4. A process for polymerizing the reaction product of a member of the class consisting of ammonia and primary amines with a halosilane having the formula $$RSiHal_3$$

wherein R is a monovalent hydrocarbon group which comprises heating said reaction product in the presence of a catalytic amount of a catalyst from the class consisting of alkali metals and alkali metal amides.

5. The process of converting hexamethylcyclotrisilazane to a higher molecular weight product, which comprises heating said silazane in the presence of a catalytic amount of a catalyst from the class consisting of alkali metals and alkali metal amides.

6. The process of converting octamethylcyclotetrasilazane to a higher molecular weight product which comprises heating said silazane in the presence of a catalytic amount of a catalyst from the class consisting of alkali metals and alkali metal amides.

References Cited in the file of this patent

UNITED STATES PATENTS

| | | |
|---|---|---|
| 2,462,635 | Haber | Feb. 22, 1949 |
| 2,503,919 | Patnode | Apr. 11, 1950 |
| 2,553,314 | Haber | May 15, 1951 |
| 2,564,674 | Cheronis | Aug. 21, 1951 |
| 2,635,059 | Cheronis | Apr. 14, 1953 |
| 2,635,060 | Cheronis et al. | Apr. 14, 1953 |
| 2,676,163 | Speier | Apr. 20, 1954 |
| 2,728,743 | Warrick | Dec. 27, 1955 |
| 2,758,127 | Goldschmidt et al. | Aug. 7, 1956 |
| 2,847,409 | De Benneville et al. | Aug. 12, 1958 |

UNITED STATES PATENT OFFICE
CERTIFICATE OF CORRECTION

Patent No. 3,143,514                August 4, 1964

William M. Boyer

It is hereby certified that error appears in the above numbered patent requiring correction and that the said Letters Patent should read as corrected below.

In the grant, line 1, and in the heading to the printed specification, line 3, for "William A. Boyer", each occurrence, read -- William M. Boyer --.

Signed and sealed this 2nd day of March 1965.

(SEAL)
Attest:

ERNEST W. SWIDER
Attesting Officer

EDWARD J. BRENNER
Commissioner of Patents